United States Patent [19]

Groen

[11] Patent Number: 5,046,158
[45] Date of Patent: Sep. 3, 1991

[54] OPTICAL SCANNING APPARATUS WITH CONTROL CIRCUIT FOR OPTIMIZING THE OPERATING RANGE OF AN A/D CONVERTER

[75] Inventor: Robertus W. C. Groen, Eindhoven, Netherlands

[73] Assignee: U.S. Philips Corporation, New York, N.Y.

[21] Appl. No.: 491,383

[22] Filed: Mar. 8, 1990

[30] Foreign Application Priority Data

Aug. 14, 1989 [NL] Netherlands .................. 8902058

[51] Int. Cl.$^5$ ............................................. H03M 1/12
[52] U.S. Cl. .................................... 341/137; 341/155; 369/54
[58] Field of Search ............... 341/137, 118, 120, 131, 341/132, 139, 142, 155; 369/54, 106, 107, 116, 120; 358/342, 348; 235/455

[56] References Cited

U.S. PATENT DOCUMENTS

| 4,091,379 | 5/1978 | Wu et al. ........................... 341/132 |
| 4,093,961 | 6/1987 | Kanamaru ..................... 369/107 X |
| 4,851,842 | 7/1989 | Iwanatsu ........................... 341/139 |

*Primary Examiner*—A. D. Pellinen
*Assistant Examiner*—Brian K. Young
*Attorney, Agent, or Firm*—Leroy Eason

[57] ABSTRACT

Optical scanning apparatus which includes an A/D converter control circuit for matching the conversion range of an A/D converter to the range of an analog signal produced by a photo-sensitive detector in response to radiation originating from a radiation source such as a laser. The converter produces a binary overflow signal which signifies whether the analog signal is within or above the conversion range of the converter. Depending on the binary value of the overflow signal, a control signal generator produces either an increasing or decreasing control signal which is returned in a feedback loop to the radiation source to control the radiation intensity or to the converter to adjust its conversion range.

8 Claims, 5 Drawing Sheets

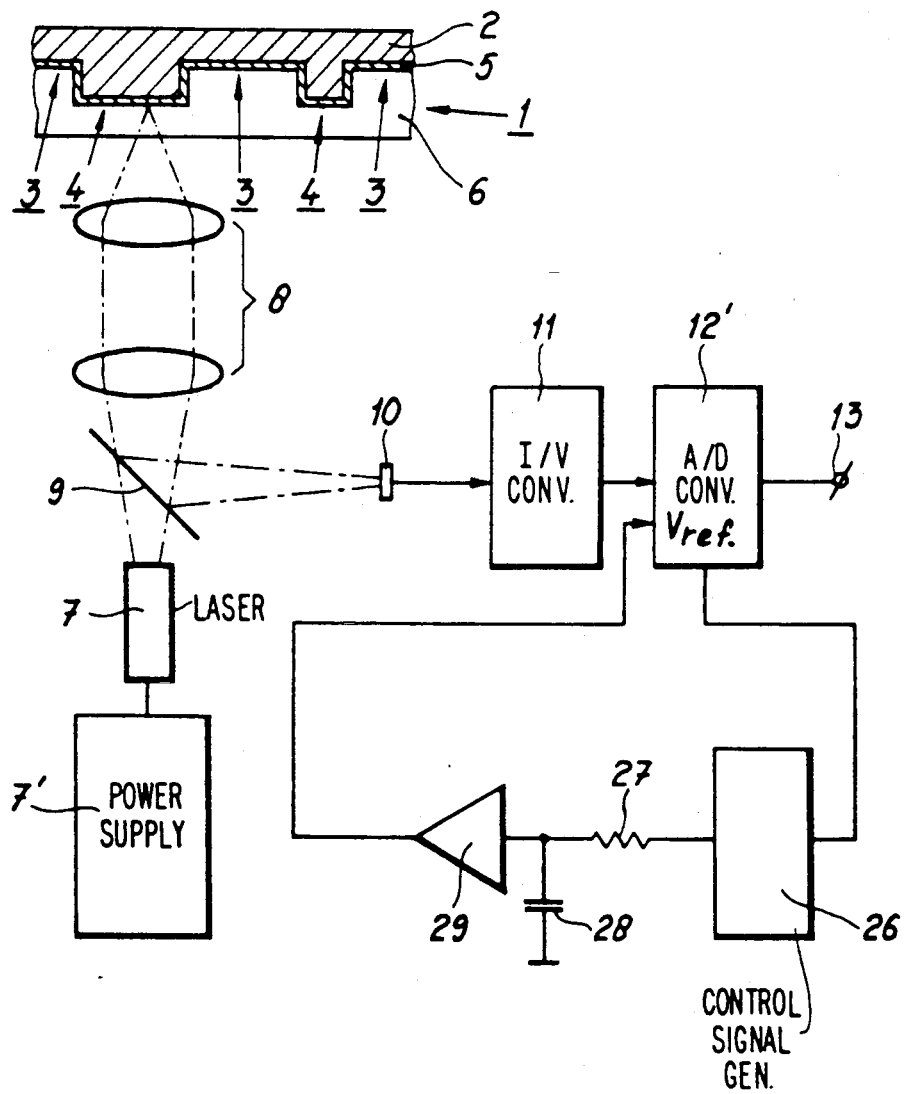

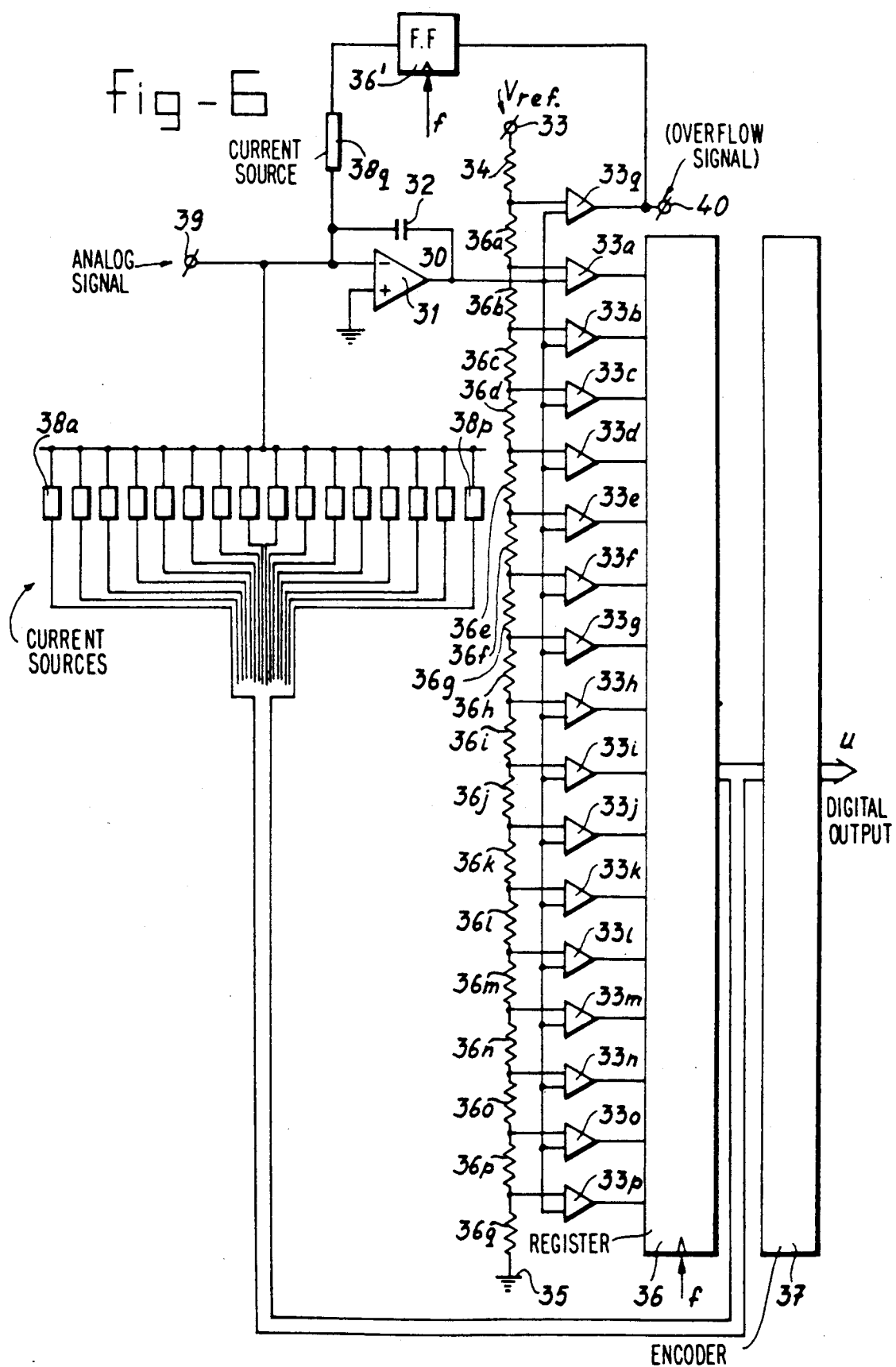

OPTICAL SCANNING APPARATUS WITH CONTROL CIRCUIT FOR OPTIMIZING THE OPERATING RANGE OF AN A/D CONVERTER

BACKGROUND OF THE INVENTION

1. Field of the Invention

The present invention relates to apparatus having a service of radiation, an optical system for projecting the radiation on at least one radiation-sensitive detector via an information carrier. It relates more particularly to an A/D converter control circuit constructed to convert an analog signal proportional to the detected radiation intensity into a digital signal which controls the radiation intensity.

2. Description of the Related Art

Apparatus of this type is disclosed in European Patent Application EP-A-0,138,273. This known apparatus employs a number of photo-sensitive semiconductors to convert the light reflected from the information carrier into a corresponding number of analog information signals. These information signals are applied to an A/D converter via a multiplexer, which converter supplies a corresponding number of digital output signals to a processing circuit. This processing circuit supplies a digital data signal, which signal is representative of the information recorded on the optical record carrier, and also supplies control signals for positioning and focus control of the optical system.

In this prior-art apparatus problems may arise if the input signal range of the converter is not adapted to an optimum extent to the conversion range of the converter. If the photo-sensitive semiconductor which converts the light reflected from the information carrier into an analog signal supplies signals whose amplitude exceeds the maximum amplitude which can be handled by the A/D converter, the bit sequence supplied by the A/D converter will not be a correct representation of the analog input signal. Conversely, if the analog signals supplied by the photo-sensitive semiconductor vary within an input signal range smaller than the conversion range of the A/D converter, this conversion range is not utilized to the full extent so that the analog input signals are digitized with a resolution smaller than attainable with A/D converter.

SUMMARY OF THE INVENTION

It is an object of the invention to provide apparatus which optimizes the operating range of the A/D converter and mitigates the above drawbacks According to the principles of the invention this is achieved in apparatus of the type described by described an arrangement enabling the input signal range and the conversion range of each A/D converter to be adapted to each other in such a manner that in the case of a maximum analog input signal on the input of the A/D converter at least approximately the maximum digital value is produced on the output of the A/D converter, which means is controlled by a signal indicating that the value of the analog signal exceeds a predetermined maximum value.

The invention enables the input signal range of the A/D converter to be gradually extended until it exactly corresponds to the conversion range of the A/D converter. This illustrative embodiment of the invention is to be preferred in particular if the conversion range of the A/D converter cannot or cannot readily be adapted. A preferred embodiment of the invention which influences the input signal range of the converter utilized a signal generator which in operation supplies a control signal to the power-supply source of the radiation source, which control signal has an increasing signal value until an overflow signal occurs.

Within the scope of the invention it is also possible to adapt the conversion range of the A/D converter to the input signal range. This is to be preferred in particular if controlling the laser light source is less desirable for reasons which are further irrelevant. In this respect another preferred embodiment of the invention is characterized in that the A/D converter is of a type whose conversion range depends on a reference signal applied to the converter, and in that said means comprise a signal generator which in operation supplies a reference signal to the relevant input of the A/D converter, which reference signal has an increasing signal value until an overflow signal occurs.

Both embodiments provide an optimum adaptation between the input signal range and the conversion range of the A/D converter. Once this optimum adaptation is achieved this situation can, in principle, be stabilized without further control being required. Put differently, the signal supplied by the generator, which increases until the optimum situation is attained. can become a signal of fixed value when the optimum situation is reached. In practice, it is found that variations may occur in the signal supplied by the -photo-sensitive semiconductor, i.e. in practice the dynamic range of the signals from the photo-sensitive semiconductor may vary to some extent. Variations in the signal are caused by variations in reflectance of the information-carrying surface as a result of the use of different surface materials, such as silver, aluminum etc. and by contaminants in the light path. Other variations which may occur in practice result from an incorrect alignment of the photo-sensitive semiconductors, so that for example the amount of light is not uniformly distributed over the various detectors in the balanced condition (the condition in which the focus error and the radial error are 0).

According to the invention it is therefore preferred to construct the signal generator in such a way that during the appearance of an overflow signal the generator supplies a reference signal of decreasing value. In this way a reference signal of alternately increasing and decreasing value is supplied so as to obtain a continuous control which continually checks whether the adaptation between the input signal range and the conversion signal range of the A/D converter is optimal. Suitably, the rate at which the value of the reference signal decreases is higher than the rate at which it increases. This yields a steady control such that when the apparatus is switched, on or a new information carrier is loaded into the apparatus the A/D converter is rapidly optimized. while during subsequent use of the information carrier a continuous and comparatively slow correction is applied for variations in light output.

BRIEF DESCRIPTION OF THE DRAWINGS

The invention will now be described in more detail with reference to the accompanying Figures.

FIG. 5 illustrates another illustrative embodiment of a control circuit in accordance with the invention, in which a voltage generator is controlled by the overflow bit of the A/D converter in order to generate an output voltage which can be used as a reference voltage in the A/D converter.

FIG. 6 shows an example of an A/D converter for use within the scope of the invention.

DETAILED DESCRIPTION OF THE PREFERRED EMBODIMENTS

Figure 1:
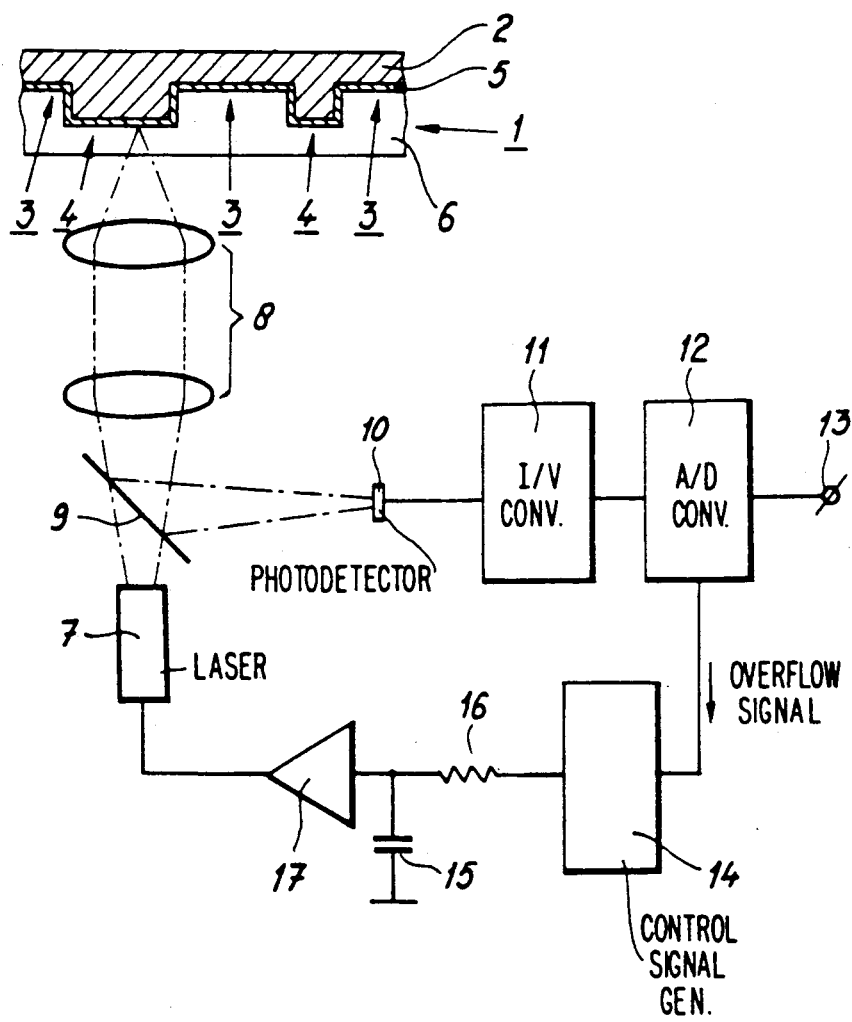
FIG. 1 illustrates a first illustrative embodiment of an A/D converter control circuit in accordance with the invention in which a laser light source is controlled in response to an overflow signal from the A/D converter.

FIG. 1 includes a diagrammatic, partly sectional view of the optical record carrier 1, for example a Compact Disc. The record carrier generally comprises a substrate 2 formed with a track structure comprising pits 3 in the substrate 2 spaced by intermediate areas 4. This track structure in relief is covered with a reflecting layer 5 and is subsequently provided with a transparent protective coating 6. The information in this track structure can be read by means of a laser beam which is generated by a laser light source 7 and projected and focused on the track structure via a lens system 8. The reflected beam is projected onto a photo-sensitive semiconductor 10 via a semitransparent mirror 9, which photo-sensitive semiconductor produces a current proportional to the light intensity. A current/voltage converter 11 converts the current generated by the semiconductor 10 into a corresponding voltage. In the A/D converter 12 the voltage on the output of the voltage/current converter 11 is converted into a series of digital values which are applied to an output 13 for transfer to further circuits which are not relevant to the present invention.

The components 1 to 13 described until now are known per se, reference being made to, for example, the publication mentioned in the opening part of this description.

In conformity with the invention the A/D converter 12 comprises an overflow output, on which an overflow signal appears to indicate whether the voltage value applied to the input of the A/D converter 12 via the current/voltage converter 11 exceeds the maximum value which can be handled by the converter 12. This overflow signal is typically constituted by a one-bit signal and is applied to a control signal generator, for example a control voltage generator 14, which generator 14 produces a continuously rising voltage on its output as long as the overflow bit has a first value, which indicates that the conversion range has not yet been exceeded. This increasing signal is applied to a power output stage 17 via a filter comprising a capacitor 15 and a resistor 16 to control the laser light source 7.

When the device is put into use the voltage generator 14 will supply a comparatively low voltage or no voltage after the electronic circuits have been reset, so that the laser light source 7 will emit hardly any or no light. The reflected light will therefore produce hardly any or no current in the detector 10, so that the A/D converter also receives only a small voltage which certainly does not result in the conversion range being overstepped.

Under these conditions the overflow bit will have a first value and under control of this bit the generator 14 will supply a continuously increasing voltage to the laser light source 7 via the filter 15, 16 and the output stage 17. As a result of this, the light output increases gradually, causing the intensity of the reflected light and hence the current supplied by the detector to increase likewise. At a given instant the voltage on the output of the current/voltage converter 11 will become so high that the A/D converter 12 is no longer capable of correctly converting this voltage because it corresponds to a digital value beyond the maximum range of the converter 12. When this situation occurs the bit will change to another state, which change is utilized to inhibit a further increase of the voltage supplied by the voltage generator 14.

The generator 14 can be controlled in response to this transition in the overflow-bit signal in several ways. It is conceivable to use the edge of the overflow-bit signal for stabilizing the output voltage of the generator 14 at a predetermined fixed value, for example equal to the instantaneously reached value or a slightly smaller value. This leads to a stable situation in which the light intensity produced by the laser light source 7 is adequate for the detector 10 to generate a current whose magnitude, after conversion into a corresponding voltage, is large enough to drive the A/D converter 12 (substantially) to its full maximum range. However, alternatively the voltage generator 14 may be constructed in such a manner that in the case of an overflow bit of the second binary value it supplies a slowly decreasing voltage, i.e. in such a manner that after overstepping of the conversion range the intensity of the light produced by the laser light source decreases gradually. At a certain instant this will result in the light intensity having decreased so far that the voltage on the input of the A/D converter is within the conversion range, causing the overflow bit to change again. As a result, the voltage generator will again supply an increasing voltage etc. By means of such a control circuit the light intensity is corrected continually in such a manner that the A/D converter always effectively operates in its maximum range. Particularly in the case of a varying light intensity as a result of other characteristics of the information carrier 1, dust or dirt in the optical system, scratches in the protective coating 6 etc. such a control will always automatically provide an optimum adaptation of the device to varying conditions, in such a way that the A/D converter always operates effectively in its maximum range.

Figure 2:
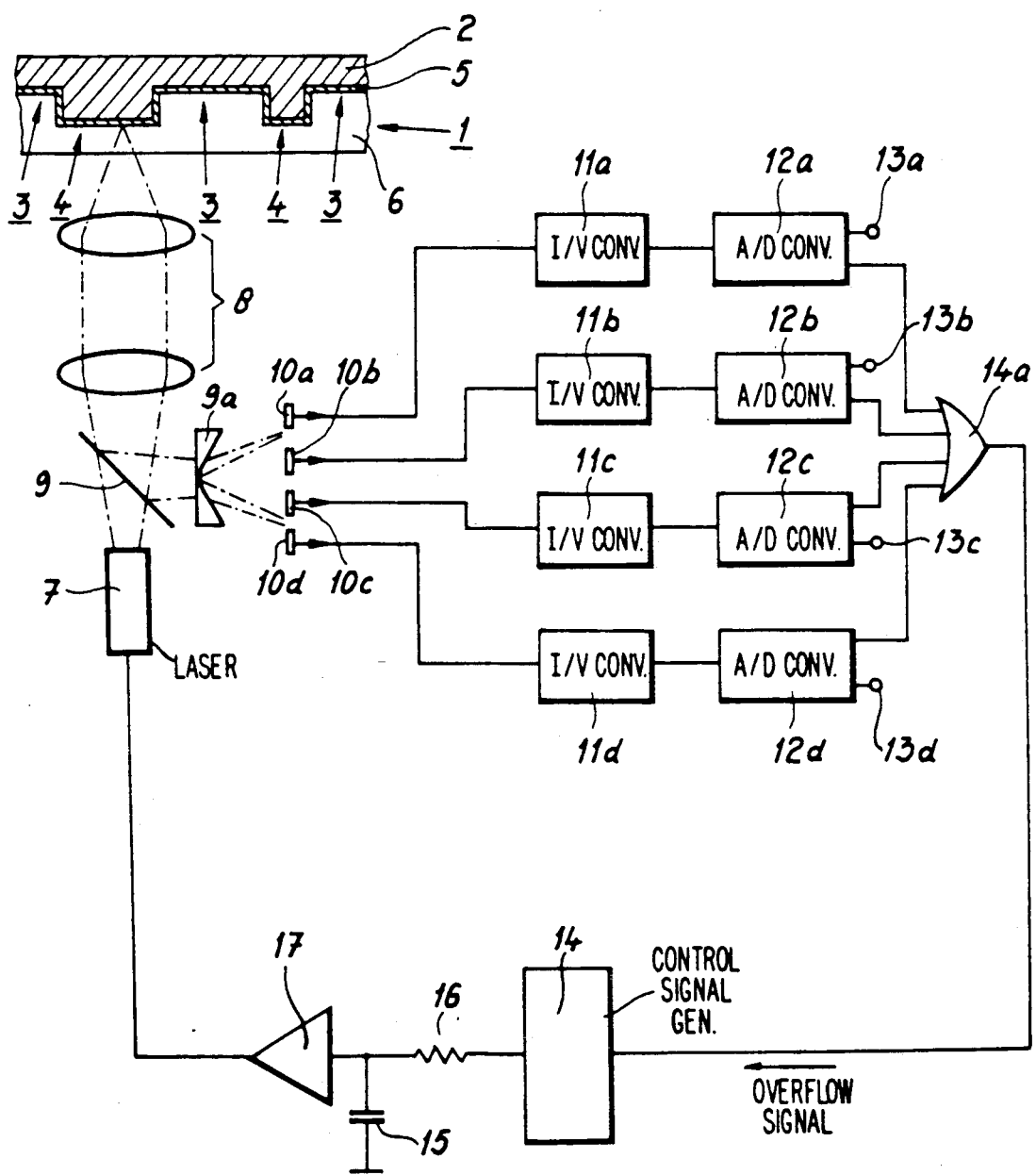
FIG. 2 presents a more practical illustrative embodiment of a control circuit in accordance with the invention.

It is to be noted that FIG. 1 shows only one detector 10. However, it is common practice to use several detectors, for example four detectors as in the system described in EP-A-0,138,273. FIG. 2 specifically illustrates a system comprising four detectors. The components 1 to 9 in FIG. 2 are identical to the corresponding components in FIG. 1 and require no further explanation. The optical system comprises a beam splitter 9a, which divides the incident light among four different detectors 10a, 10b, 10c and 10d. Each of these detectors supplies an output signal to a current/voltage converter referenced 11a, 11b, 11c and 11d respectively in FIG. 1. Each of these converters supplies an output signal to an A/D converter, which A/D converters are referenced 12a, 12b, 12c and 12d in FIG. 1. The overflow inputs of the A/D converters 12a...12d are connected to the inputs of an OR-gate 14a whose output supplies a control signal for the voltage generator 14. If an overflow signal appears in one of the A/D converters 12a...12d the control circuit will subsequently operate in exactly the same way as described for the simplified circuit shown in FIG. 1.

Figure 3:
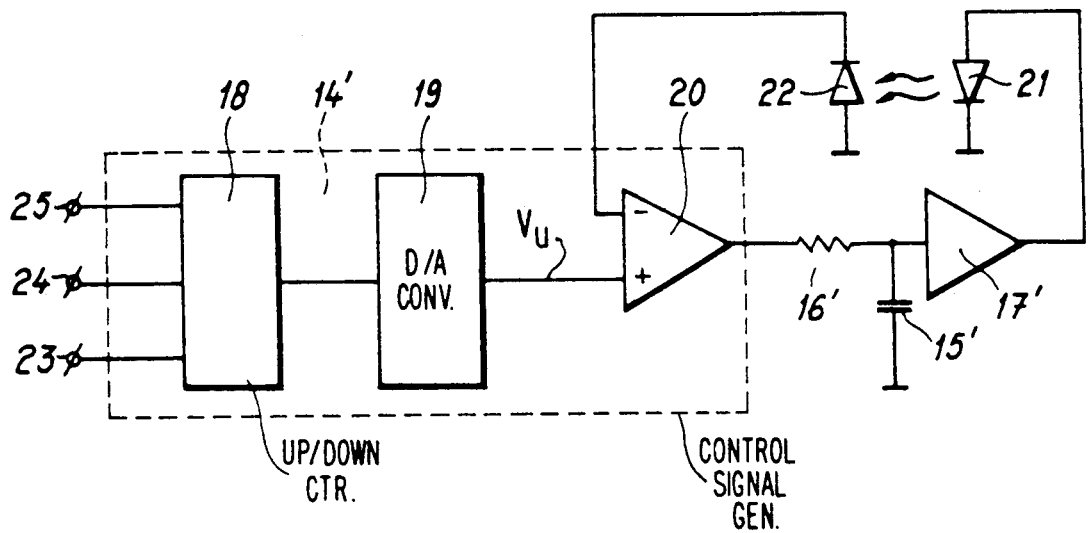
FIG. 3 shows in more detail the voltage generator supplying the control voltages for the laser light source.

FIG. 3 shows an example of the control signal generator 14 in combination with a further development of the control loop for controlling the laser light source 7. The control signal generator 14' shown in FIG. 3 comprises an up/down counter 18, a D/A converter 19 and a comparator 20. The comparator 20 supplies an output signal to the power stage 17' via filter comprising the capacitor 15' and the resistor 16', the laser diode 21 being driven by the power stage. Light emitted by the laser diode 21 is received by (inter alia) the photo-sensitive diode 22, which supplies a signal corresponding to the intensity of the incident light to the other input of the comparator 20.

If, in order to explain the operation of the circuit, it is assumed that the voltage on the positive input of the comparator 20 does not vary, it will be evident that the circuit comprising the components 15', 16', 17', 20, 21 and 22 constitutes a control loop which maintains the intensity of the emitted light constant, the voltage on the positive input of the comparator 20 dictating the reference level at which the light intensity is maintained.

The voltage on the positive input of the comparator 20 is supplied by the digital/analog converter 19, which in its turn is controlled by the counter 18. The counter 18 is used in combination with a control stage to which 3 input signals can be applied, i.e. the overflow signal from the analog/digital converter 12, which overflow signal is applied to an input 23, a first time-constant signal, which is applied to an input 24, and a second time-constant signal, which is applied to an input 25.

The circuit is constructed in such a manner that the value of the bit on the input 23, i.e. the value of the overflow signal, dictates whether the counter counts up or counts down. The count-up rate of the counter depends on the time-constant signal on the input 24 and the countdown rate of the counter depends on the time-constant signal on the input 25. The two time-constant signals can be used, for example, for suitably setting a divider which divides the clock-pulse frequency by a specific value, after which the divided clock-pulse signal is applied to the clock input of the actual counter.

Figure 4:
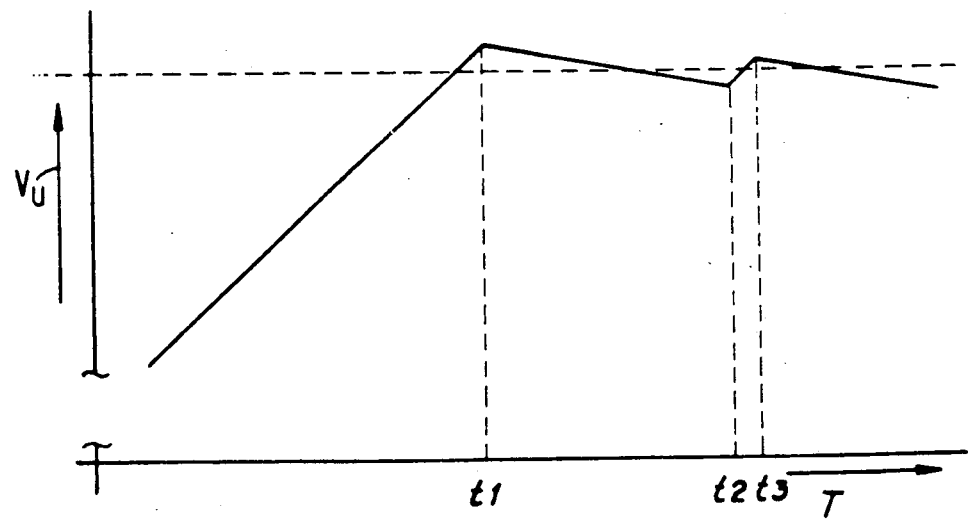
FIG. 4 depicts a voltage waveform diagram to illustrate the operation of the circuit shown in FIG. 2.

FIG. 4 shows diagrammatically the output-voltage waveform of the D/A converter 19 during lock-in of the circuit. When the circuit is started the counter 18 is reset to a comparatively low initial value or to 0, so that the D/A converter supplies a small voltage or zero-voltage to the comparator 20. As a result of this low voltage the intensity of the light emitted by the diode 21 will be so low that the A/D converter 12 supplies only comparatively small digital values for which definitely no overflow occurs. The overflow signal on the input 23 of the counter 18 consequently has a first predetermined value, which causes the counter 18 to count up. This results in an ascending series of digital values being applied from the counter 18 to the D/A converter 19, causing the output voltage of the converter 19 to increase gradually (in FIG. 4 this output voltage is represented as a pure sawtooth waveform; however, it will be obvious to those skilled in the art that in reality the voltage appearing on the output of the converter 19 increases in small steps). This increasing output voltage of the converter 19 ensures that the setpoint of the light-intensity control loop comprising the components 15', 16', 17', 20, 21 and 22 is continually shifted in such a direction that the light emitted by the laser diode 21 increases continually. The amplitude of the voltage values to be converted by the converter 12 therefore increases and at the instant T1 an overflow condition will arise in the A/D converter. As a result of this, the value of the overflow bit on the input 23 of the counter 18 will change, causing the counter 18 to be set to its count-down mode. The count-down rate is dictated by a time-constant signal applied to the input 25. Preferably, this rate will be smaller than the count-up rate in the preceding cycle, said count-up rate being determined by the time-constant signal on the input 24. As a consequence, the output voltage of the converter 19 will decrease gradually during count-down until at the instant T2 it is detected that the overflow situation has ceased. This gives rise to another transition in the overflow signal on the input 23 so that the counter 18 is again set to the count-up mode, resulting in an increasing output voltage of the counter 19 until at the instant T3 a new overflow situation is detected etc.

For the sake of being complete it is to be noted that the use of control loops for controlling the light intensity of a laser light source (e.g. 7; 21) is known in the art, for example from U.S. Pat. No. 4,093,961. However, the present invention does not relate to a laser control circuit per se but to the manner in which a control signal is derived and used in a laser control circuit.

FIG. 5 shows another illustrative embodiment of an A/D converter control circuit in accordance with the invention. The components shown in are identical to the corresponding components shown in FIG. 1 and require no further explanation. In the present case the laser light source 7 is controlled by a separate power-supply unit 7', which may be, for example, of a type as described in the above-mentioned U.S. Pat. No. 4,093,961. The output voltage of the converter 11 is applied to an A/D converter 12' of a type adapted to receive an external reference voltage $V_{ref}$ on a separate input. A converter which is very suitable for this purpose is a sigma-delta modulator, of which an example will be described briefly with reference to FIG. 6. The conversion range of such a sigma-delta modulator is dictated by the reference voltage on the input $V_{ref}$, so that it will be appreciated that a change of this reference voltage results in a change of the conversion range. The invention utilizes this property by providing a feedback loop which begins at the overflow signal output of the A/D converter 12'.

The overflow signal is applied to a control signal generator 26, which produces a rising output voltage on its output as long as the binary overflow signal has a first value. This output voltage of the generator 26 is applied to a driver stage 29 via filter comprising a resistor 27 and a capacitor 28, the driver stage supplying its output voltage to the reference signal input $V_{ref}$ of the converter 12'. If the control signal generator 26 is of a construction similar to that in FIG. 2 as described above, it will be evident that the reference voltage $V_{ref}$ is always controlled to an optimum value around the very point where input signals of maximum amplitude value are converted into digital signals at the limit of the conversion range of the A/D converter 12'.

It is to be noted that the circuit shown in FIG. 5 may also be employed in an embodiment comprising a plurality of detectors, in which case each of the A/D converters may be provided with such a control circuit.

FIG. 6 shows in greater detail an example of an analog-digital converter suited for use within the scope of the present invention. The input signal applied to the input 39 is supplied to a filter 30 having a low-pass characteristic, for example an integrator which, in a customary manner, may comprise an operational amplifier 31 and a capacitor 32.

The output signal of the filter 30 is applied to the non-inverting inputs of each of a plurality of comparators 33a,...,33p. A series arrangement of resistors 36a,...,36q having equal resistance values is connected between a terminal 33 at a reference potential $V_{ref}$ and a terminal 35 at zero potential. The nodes between the resistors 36 are connected to the inverting inputs of the comparators 33a...33p. The output signals of the sixteen comparators 33 can indicate sixteen different signal levels. The outputs of the comparators 33a...33p are coupled to a clocked parallel-in parallel-out register 36, which in response to every pulse of a clock signal having a frequency f is loaded with the output signals of the comparators 33a...33p. The outputs of the register 36 are connected to a 16-to-4 encoding circuit 37, which converts the signal values represented by the outputs of the register 36 into a 4-bit code. The outputs of the register 36 are each connected to a control input of current sources 38a,...38p. The current sources are of a type responsive to a control signal of a predetermined level to generate a current of predetermined value. The currents supplied by the current sources 38a...38p are added to the signal current, which is applied to the low-pass filter 30 via the input 39. The output signal of the comparator 33q is applied to a current source 33q via a clocked flip-flop 36', which is controlled by the clock signal of the frequency f. The current source 33q is of a type similar to the current sources 38a,...,38p and supplies a current of said predetermined value to the low-pass filter 30 when the overflow signal occurs.

In addition to the resistors 36a...36q a resistor 34 is arranged between the terminals 33 and 35 in order to derive a comparison voltage for the further comparator 33q, whose other input receives the input signal. If the amplitude of the input signal is so large that it exceeds the reference voltage on the node between the resistors 34 and 36a the comparator 33q will supply an overflow signal to the output 40.

It will be obvious to those skilled in the art that various alterations and modifications are possible without departing from the scope of the invention.

I claim:

1. Optical scanning apparatus comprising a radiation source, an optical system for projecting radiation produced by said source on an optical record carrier, and at least one radiation-sensitive detector for receiving reflected radiation from said record carrier and producing an analog signal proportional to the detected radiation intensity; characterized in that said apparatus further comprises a control circuit which includes:

an A/D converter for receiving said analog signal and converting it into a digital output signal of corresponding value, said converter having a conversion range such that a maximum value of the digital output signal corresponds to a predetermined value of said analog signal, said converter further producing a binary overflow signal which signifies whether said analog signal is below or above said predetermined value thereof; and a control signal generator connected to said converter to receive said binary overflow signal and produce a feedback control signal which increases or decreases depending on the value of said overflow signal, said control signal being returned to one of said radiation source and said converter so as to cause the maximum value of said analog signal to be maintained substantially at said predetermined value thereof which corresponds to said conversion range of said converter.

2. Apparatus as claimed in claim 1, wherein said control signal generator supplies said feedback control signal to said radiation source so as to cause it to increase the intensity of the radiation produced thereby until the value of said overflow signal produced by said converter signifies that said analog signal is above said predetermined value thereof which corresponds to said conversion range of said converter.

3. Apparatus as claimed in claim 1, wherein the conversion range of said converter is adjustable by a reference signal applied thereto, and said feedback control signal is supplied by said control signal generator signal to said converter as said reference signal therefor; said control signal being increased by said control signal generator until said overflow signal signifies that said analog signal is above said predetermined value thereof which corresponds to said conversion range of said converter.

4. Apparatus as claimed in claim 2 or 3, wherein said control signal generator is adapted to decrease said control signal when said overflow signal signifies that said analog signal exceeds said predetermined value thereof which corresponds to said conversion range of said converter.

5. Apparatus as claimed in claim 3, wherein said control signal generator supplies said control signal to said converter in digital form and at a predetermined repetition frequency, the value of such digital control signal increasing so long as said overflow signal signifies that said analog signal is below said predetermined value and decreasing so long as said overflow signal signifies that said analog signal is above said predetermined value.

6. Apparatus as claimed in claim 2 or 3, wherein the rate at which the control signal supplied by said control signal generator increases depends on an incrementation time constant and the rate at which it decreases depends on a decrementation time constant.

7. Apparatus as claimed in claim 6, wherein said decrementation time constant exceeds said incrementation time constant.

8. Apparatus as claimed in claim 4, wherein said control signal generator maintains said control signal at a predetermined fixed value after increasing it to such fixed value, and decreases it from such fixed value when said overflow signal signifies that said analog signal exceeds said predetermined value thereof which corresponds to said conversion range of said converter.

* * * * *